UNITED STATES PATENT OFFICE.

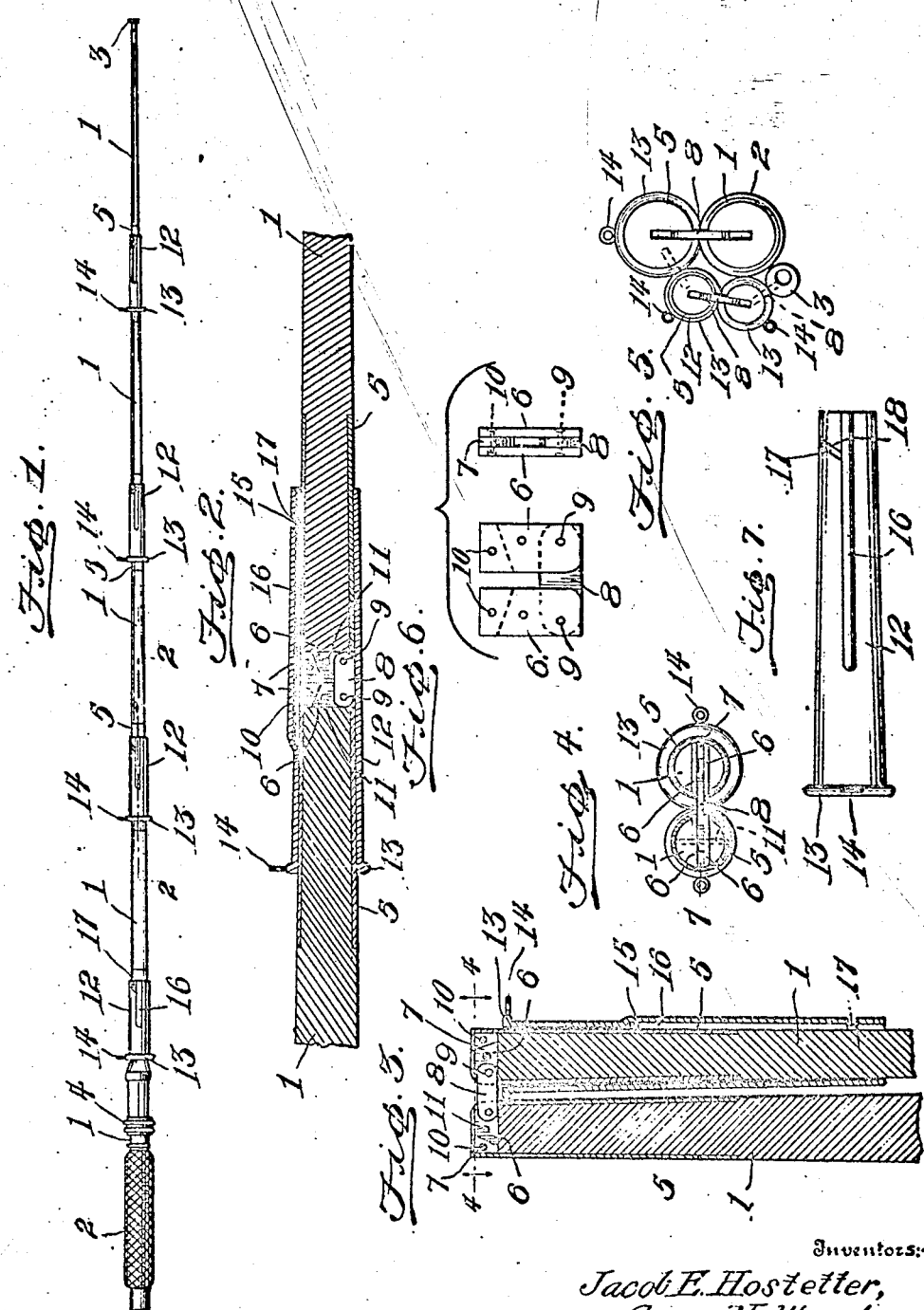

JACOB E. HOSTETTER AND GEORGE N. WORST, OF PEQUEA, PENNSYLVANIA.

FISHING-ROD.

No. 895,...2.  Specification of Letters Patent.  Patented Aug. 4, 1908.

Application filed November 5, 1907.  Serial No. 400,822.

*To all whom it may concern:*

Be it known that we, JACOB E. HOSTETTER and GEORGE N. WORST, citizens of the United States, residing at Pequea, in the county of Lancaster and State of Pennsylvania, have invented new and useful Improvements in Fishing-Rods, of which the following is a specification.

This invention relates to fishing rods and the object of the invention is to produce a rod which may be compactly folded so as to occupy but small space adapting it to be conveniently carried in a suit case, satchel or trunk, the rod embodying a plurality of sections connected together by hinge joints and combined with means for bracing the rod sections adjacent to the joints between the same.

With the above and other objects in view, the invention consists in the novel construction, combination and arrangement of parts hereinafter fully described, illustrated and claimed.

In the accompanying drawing:—Figure 1 is a plan view of a fishing rod embodying the present invention and shown fully extended. Fig. 2 is an enlarged longitudinal section through the adjacent ends of two sections of the rod showing the joint which connects the sections and the clamping sleeve which braces the ends of the sections relatively to each other. Fig. 3 is a view similar to Fig. 2 but showing the sections folded side by side. Fig. 4 is a section taken on the line 4—4 of Fig. 3. Fig. 5 is an end view of a complete rod after the same has been folded. Fig. 6 illustrates the hinge in plan and edge elevation. Fig. 7 is a plan view of the clamping sleeve.

The fishing rod contemplated in this invention may comprise any desired number of sections 1, one of the terminal sections comprising a suitable handle 2 while the opposite terminal section is provided with a final line bearing eye 3.

4 designates a reel holding device on the handle section of the rod.

As the same kind of a joint is employed at the meeting ends of each adjoining pair of sections, the description of one of said joints takes the place for all. In producing these joints it is preferable to provide the ends of the sections adjacent to the joints with metal caps or ferrules 5 which give the necessary protection to the ends of the sections and which also provide housings for portions of the hinge, as hereinafter described.

Each hinge embodies a pair of leaves as best illustrated in Figs. 2 and 6 and each leaf, by preference, embodies a pair of oppositely arranged members 6 between which, at one end is arranged a spacing piece 7 which serves to hold the members 6 at suitable distances apart to receive between them the connecting link 8 which has its opposite ends pivotally mounted at 9 between the members 6—6 of each of the hinge leaves, as shown in Fig. 6. The spacing pieces 7 are preferably held between the members 6 by rivets 10 or their equivalent.

The adjacent ends of the sections are slotted as indicated in Figs. 2 and 3 sufficiently to enable the leaves 6 to be housed within the metal caps or ferrules 5 and are held therein by rivets 11 or their equivalent. By means of the construction described, the rod sections may be swung into the same longitudinal plane as shown in Fig. 2 or folded side by side as shown in Fig. 3, the connecting link 8 being of such length as to permit such folding.

In order to brace the sections relatively to each other when in the same longitudinal plane, we employ a clamping sleeve 12 which is made tapering as shown to correspond with the taper of the rod sections and provided at one end with a reinforcing bead 13 provided at one side with an eye or fairleader 14 through which the fishing line is led from the reel to the terminal eye 15 it being understood that each of the clamping sleeves is provided with such an eye 14 which enables the rod to be folded without disconnecting the fishing line therefrom. On the smaller sections is arranged a projecting pin or stud 15 which is adapted to traverse the slot or groove 16 in the clamping sleeve 12 when said sleeve is moved in the direction of the larger of the two sections. The lateral extension 17 of said groove or slot is disposed at an acute angle to the main body of the slot so that when the sleeve 12 is turned partially around on the said rod, a wedging shoulder 18 is provided which coöperates with the pin 15 to crowd one section of the rod toward the adjoining section thereby causing the rod sections to be pressed firmly together end to end, while the clamping sleeve overlaps the jointed ends of the sections and prevents the joint from breaking.

All joints connecting the sections of the rod are the same in construction but they are connected with their respective sections in such manner that the connecting links 8 will extend in different planes or directions as illustrated in Fig. 5 for the purpose of enabling the sections to be folded side by side in a cluster thus making the rod very compact and adapted to be carried in a suit-case, satchel or trunk.

To fold the rod the clamping sleeve 12 is slid toward the small end of the rod which frees the same from its binding engagement therewith.

We claim:—

1. A fishing rod comprising sections, a hinge joint connecting the same, a locking pin on one section, and a clamping sleeve adapted to cover and uncover said joint and provided with a bayonet slot the lateral extension of which is disposed at such angle as to provide a wedging shoulder which coöperates with the locking pin, substantially as described.

2. A fishing rod comprising sections, a hinge joint connecting the same, said sections provided at their adjacent ends with metal caps, and a clamping sleeve adapted to cover and uncover said joint, the hinge joint embodying leaves housed and fastened within said caps, and links connecting said leaves.

3. A fishing rod comprising sections, a hinge joint connecting the same, and a clamping sleeve adapted to cover and uncover said joint, the hinge joint embodying leaves attached to the adjacent ends of the sections and a link connecting said leaves and disposed to one side of the axial center on the section.

In testimony whereof we affix our signatures in presence of two witnesses.

JACOB E. HOSTETTER.
GEO. N. WORST.

Witnesses:
I. H. MASON,
M. I. WANNER.